United States Patent [19]

Pearson et al.

[11] Patent Number: 5,632,590
[45] Date of Patent: May 27, 1997

[54] METHOD AND SYSTEM FOR LOADING PANELS INTO SHIPPING CONTAINERS AT A WORK STATION AND END EFFECTOR FOR USE THEREIN

[75] Inventors: Thomas E. Pearson, Grosse Ile; James R. Panyard, Westland, both of Mich.

[73] Assignee: Ford Motor Company, Dearborn, Mich.

[21] Appl. No.: 491,328

[22] Filed: Jun. 30, 1995

[51] Int. Cl.$^6$ ................................................ B65G 59/00
[52] U.S. Cl. .................... 414/404; 414/416; 414/730; 414/732; 414/789.5; 294/907
[58] Field of Search ............................ 414/404, 416, 414/627, 659, 660, 730, 732, 736, 737, 786, 798.5, 798.9; 294/65, 907; 901/40, 45

[56] References Cited

U.S. PATENT DOCUMENTS

| | | | |
|---|---|---|---|
| 1,959,216 | 5/1934 | Owen | 414/627 X |
| 3,168,184 | 2/1965 | Galvin | 198/20 |
| 3,178,041 | 4/1965 | Wheat . | |
| 3,598,263 | 8/1971 | Ehmke . | |
| 3,630,389 | 12/1971 | Schmidt . | |
| 4,228,886 | 10/1980 | Moran | 901/40 X |
| 4,266,905 | 5/1981 | Birk et al. | 414/627 |
| 4,287,459 | 9/1981 | Dahlström | 901/40 X |
| 4,444,537 | 4/1984 | Werner | 414/737 X |
| 4,553,892 | 11/1985 | Huffman et al. | 414/121 |
| 4,571,320 | 2/1986 | Walker | 264/40.1 |
| 4,627,785 | 12/1986 | Monforte | 414/730 |
| 4,657,470 | 4/1987 | Clarke et al. | 414/627 |
| 4,685,714 | 8/1987 | Hoke | 294/81.2 |
| 4,778,329 | 10/1988 | Phillips | 414/732 X |
| 4,828,304 | 5/1989 | No et al. | 294/2 |
| 4,832,180 | 5/1989 | Ferrero | 198/468.3 |
| 4,846,625 | 7/1989 | Gabillet | 414/737 |
| 4,848,757 | 7/1989 | De Fazio | 267/150 |
| 4,863,340 | 9/1989 | Masunaga et al. | 294/65 X |
| 4,884,938 | 12/1989 | Fujita et al. | 414/541 |
| 4,960,298 | 10/1990 | Moroi | 294/64.1 |
| 4,976,344 | 12/1990 | Hultberg | 198/418.2 |
| 5,102,114 | 4/1992 | Suda | 271/18 |
| 5,172,922 | 12/1992 | Kowaleski et al. | 279/3 |
| 5,173,029 | 12/1992 | Delventhal et al. | 414/754 |
| 5,197,847 | 3/1993 | Kremer et al. | 414/752 |
| 5,207,553 | 5/1993 | Konagai | 414/737 |
| 5,256,030 | 10/1993 | Tanaka et al. | 414/798.9 |
| 5,290,134 | 3/1994 | Baba | 414/404 |
| 5,330,311 | 7/1994 | Cawley et al. | 414/416 |
| 5,387,068 | 2/1995 | Pearson | 414/404 |

FOREIGN PATENT DOCUMENTS

| | | |
|---|---|---|
| 1191168 | 7/1985 | Canada . |
| 2639335 | 5/1990 | France . |
| 3018082 | 11/1981 | Germany . |
| 0127920 | 5/1988 | Japan . |
| 0088620 | 4/1991 | Japan . |
| 0087788 | 3/1992 | Japan . |

Primary Examiner—James W. Keenan
Attorney, Agent, or Firm—Joseph W. Malleck; Roger L. May

[57] ABSTRACT

A robotic end effector adapted to be mounted at the end of an arm of a program-controlled robot is capable of providing compliance within a vertical plane as well as alignment along a horizontal axis. A method and system utilizing the end effector to pick up flat or curved glass panels from glass racks and place the glass panels into irregularly-shaped wooden crates. Due to the compliance and horizontal alignment provided by the end effector, the system allows essentially perfect piece-to-piece vertical edge-of-glass alignment and side-edge to side-edge alignment during the packaging process so as to eliminate glass etching/scratching and breakage. The end effector includes a base frame on which compliance devices and side-shift alignment devices in the form of linear bearing systems support a number of material handling devices in the form of suction devices. The handling devices are typically material holding/gripping devices. Selected ones of the compliance devices can be locked out under the control of a controller for the robot. Also, a number of counterbalancers change counterbalance forces based on glass panel size also under control of the controller of the robot. Each suction device includes a spring-biased suction cup to also provide compliance in a direction substantially normal to the compliance provided in the vertical plane.

20 Claims, 7 Drawing Sheets

METHOD AND SYSTEM FOR LOADING PANELS INTO SHIPPING CONTAINERS AT A WORK STATION AND END EFFECTOR FOR USE THEREIN

TECHNICAL FIELD

The invention relates to methods and systems for loading panels into shipping containers at a work station and an end effector for use therein and, in particular, to methods and systems for loading glass panels into shipping containers at a work station and an end effector for use therein.

BACKGROUND ART

It is often necessary to repackage flat or curved glass from steel "leanback" glass racks and place the glass sheets into irregularly-shaped wooden crates for shipping. Such wooden crates are often warped and handmade. It is desirable to place such glass sheets into such low cost wooden crates quickly and in a repeatable fashion.

Previous attempts to load such glass sheets into such wooden crates employed known box location assumptions but ignored positional irregularities related to the box bottom or floor. One approach that has been used to detect such positional irregularities is to use a sensor to locate the bottom of the shipping crate. The U.S. Patent to Pearson, U.S. Pat. No. 5,387,068 discloses a method, a system and an end effector for use therein to provide selective vehicle compliance which allows for packaging sheet material such as glass sheets into irregularly-shaped shipping crates.

However, none of the prior art noted above deal with a robotic system for repackaging glass panels into irregularity-shaped crates wherein the glass panels are presented with large side-edge to side-edge positional variations. Glass panels must be loaded into shipping crates with no side-to-side variation (i.e., the pack of glass panels should appear as a "block of ice"). Any variation in the side-to-side glass edge repeatability leads to shifts in glass during shipment. These shifts in glass result in "etch" marks, scratches, and occasional breaks.

SUMMARY OF THE INVENTION

An object of the present invention is to provide a method, a system and end effector for use therein to provide horizontal axis panel alignment during placement of the panels into irregularly-shaped or precision shipping crates.

Another object of the present invention is to provide a method, a system and end effector for use therein for automatically, rapidly and accurately repackaging flat or curved glass panels into irregularly-shaped or precision shipping crates.

In carrying out the above objects and other objects of the present invention, a method is provided for loading a desired number of panels into a shipping container from a storage container at a work station. The work station includes a robot controlled by a programmable controller. The robot has an end effector movable with respect to controlled axes. The end effector includes a base frame coupled to the robot and at least one material handling device supported on the base frame. The method includes the steps of: (a) moving the end effector with respect to the controlled axes to allow the at least one material handling device to pick up the at least one panel from the storage container; and (b) moving the end effector with respect to the controlled axes to place the at least one panel in the shipping container. The method also includes the steps of: (c) allowing the at least one material handling device to move relative to the base frame in an upward direction substantially opposite a downward direction of the base frame upon engagement of a bottom edge of the at least one panel with a floor of the shipping container; (d) moving the at least one material handling device relative to the base frame in a horizontal direction substantially orthogonal to the upward direction in response to a first control signal from the controller until engagement of a side edge of the at least one panel with a side stop of the shipping container; and (e) releasing the at least one panel after steps (c) and (d) so that the at least one panel is supported on the floor at its bottom edge and the side edge of the at least one panel is positioned in a predetermined relationship with respect to the side stop. Finally, the method includes the step of repeating steps (a) through (e) until the desired number of panels are supported at their bottom edges on the floor of the shipping container with substantially no side-to-side variation.

Further, in carrying out the above objects and other objects of the present invention, a system is provided for loading a desired number of panels into a shipping container from a storage container at a work station. The system includes a program-controlled robot having an arm provided with an end effector movable with respect to controlled axes, wherein the end effector includes a base frame coupled to the arm of the robot and at least one material handling device supported on the base frame to receive and retain at least one panel. The system also includes a controller for (1) causing the robot to move the end effector with respect to the control axes to pick up the at least one panel from the storage container and place the at least one panel in the shipping container, and (2) causing the at least one material handling device to receive, retain and then release the at least one panel so that the at least one panel is supported on a floor of the shipping container at a bottom edge of the at least one panel. The end effector further includes (a) a vertical compliance device for supporting the at least one material handling device on the base frame to allow the at least one material handling device to move relative to the base frame in an upward direction substantially opposite a downward direction of the base frame upon engagement of the bottom edge of the at least one panel with the floor of the shipping container and (b) a side-shift alignment device for supporting the at least one material handling device on the base frame to move the at least one material handling device relative to the base frame in a horizontal direction substantially orthogonal to the upward direction in response to a first control signal from the controller until engagement of a side edge of the at least one panel with a side stop of the shipping container and prior to release of the at least one panel by the at least one material handling device.

Still further in carrying out the above objects and other objects of the present invention, an end effector is provided for use with a robot controlled by a programmable controller to load a desired number of panels into a shipping container from a storage container at a work station. The end effector includes a base frame adapted to be mounted on the robot and at least one material handling device supported on the base frame. The at least one material handling device is adapted to receive and retain at least one panel in the storage container and then release the at least one panel in the shipping container so that the at least one panel is supported on a floor of the shipping container at a bottom edge of the at least one panel. The end effector further includes a vertical compliance device for supporting the at least one material handling device on the base frame to allow the at least one material handling device to move relative to the base frame in an upward direction substantially opposite a downward direction of the base frame upon engagement of the bottom edge of the at least one panel with the floor of the shipping container. Finally, the end effector includes a side-shift alignment device for supporting the at least one material handling device on the base frame to move the at least one material handling device relative to the base frame in a horizontal direction substantially orthogonal to the upward direction in response to a first control signal from the controller until engagement of a side edge of the at least one panel with a side stop of the shipping container.

Preferably, the panels are glass panels. The shipping container may be a regularly-shaped or an irregularly-shaped crate and the storage container may be a regularly-shaped glass rack.

Also, preferably, the end effector includes a plurality of material handling devices supported at a plurality of spaced locations on the base frame to receive and retain a number of glass panels.

Still, preferably, a counterbalancer is provided for each material handling device for counterbalancing its material handling device and its associated glass panel based on the size of its associated glass panel in response to a second control signal from the controller.

The advantages accruing to the use of the method, system and end effector of the present invention are numerous. For example, inexpensive, irregularly-shaped crates rather the regularly-shaped containers can be used to ship the flat or curved glass panels. Also, the method, system and end effector allow substantially perfect piece-to-piece vertical edge of glass alignment and side-to-side glass edge repeatability during the repackaging process from the glass racks to the irregularly-shaped crates. Glass alignment is very important for quality and allows packing materials to be placed tightly against each piece of glass in the package, thereby effectively eliminating glass-to-glass relative motion. By eliminating this relative motion, glass etching/scratching as well as glass breakage is basically eliminated and the repackaged pack of glass panels appears as a "block of ice".

The vertical compliance upon demand allows for accurate glass pickup under a no compliance condition while allowing for rapid cycle times for glass placement/release under a compliant condition. The vertical compliance and side-shift alignment allows for wood warpage, wood deformation under the applied weight of the glass and variations in metal dollies used to carry the wooden crates within a manufacturing plant. The side-shift alignment can be controlled by the controller to provide varying levels of side-shift force.

The counterbalancers greatly reduce the weight associated with additional tooling and glass from stressing the glass side edge during the placement and packing process. This is very important with irregular packaging since small surface areas of the glass can receive a large percentage of both tooling and glass weight. This can result in breakage or more commonly, "flake" or "V" chips.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
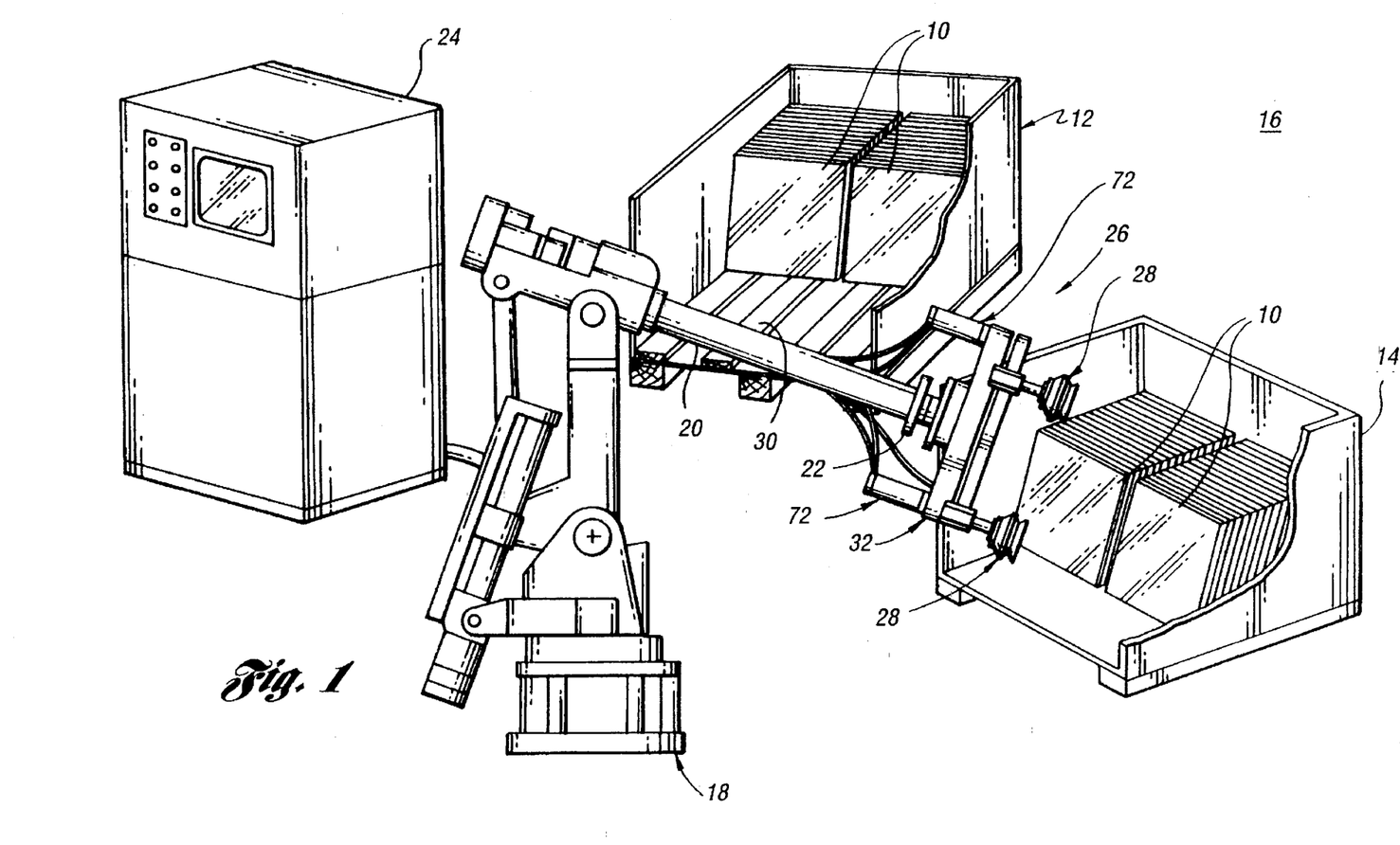
FIG. 1 is a schematic perspective view illustrating the method, the system and end effector of the present invention.

Referring now to the drawing figures, there is illustrated in FIG. 1 a system for loading a desired number of curved or flat panels such as metal or glass sheets or panels 10 into a wooden, irregularly-shaped shipping container or crate, generally indicated at 12, from a steel storage container or glass rack 14 at a work station 16.

The system also includes a program-controlled robot. The robot 18 includes an arm 20 to which a wrist 22 is attached.

Figure 2:
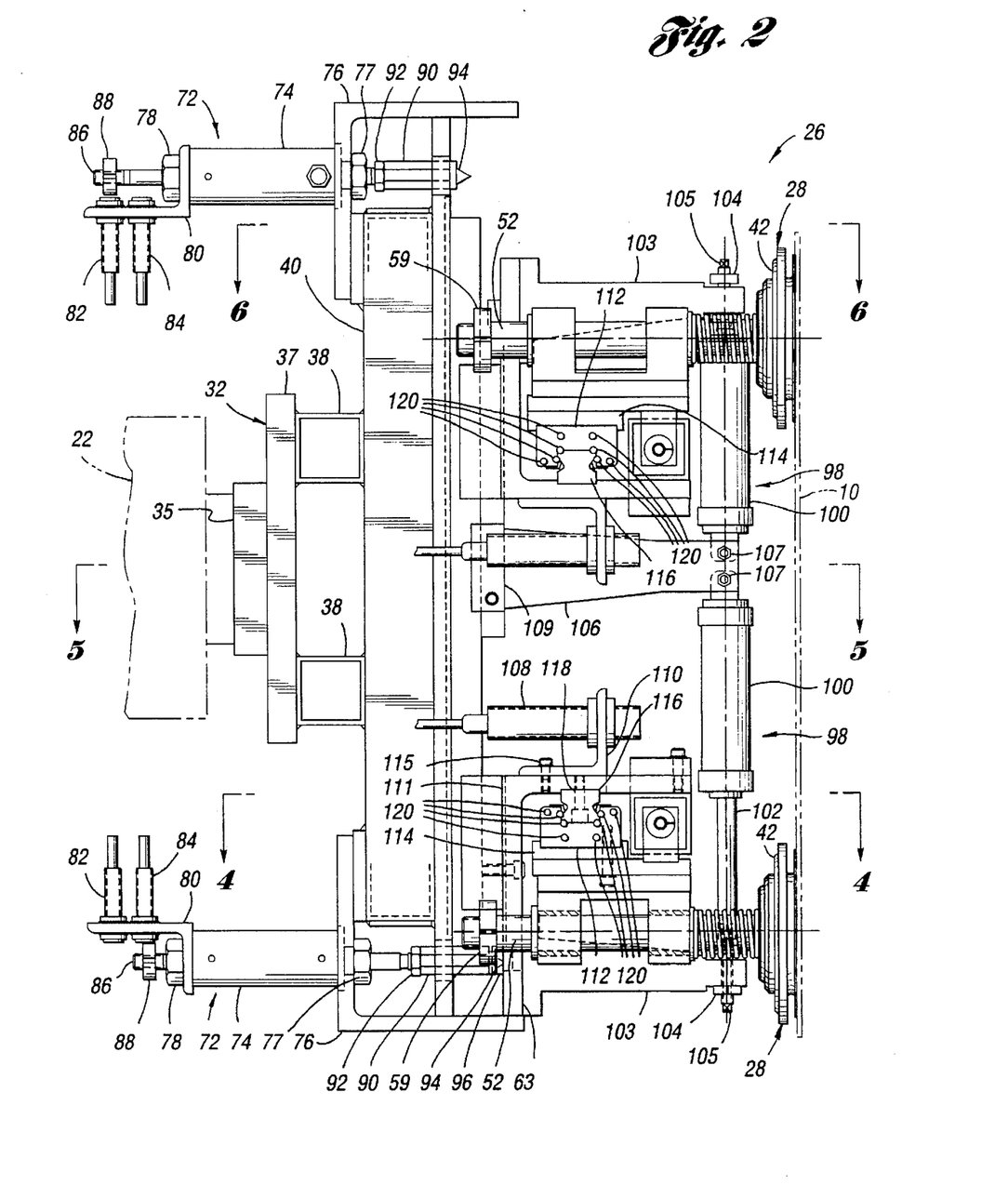
FIG. 2 is a side elevational view, partially broken away and in cross-section, of the end effector of FIG. 1 with a wrist of the robot of FIG. 1 and a pair of glass panels illustrated in phantom.

The robot 18 is controlled to move under program control by a controller 24. In turn, the robot 18 moves an end effector, generally indicated at 26, mounted at a distal end of the robot arm 20 at its wrist 22 with respect to controlled axes. The end effector 26 is controlled to move with respect to the controlled axes to allow the lower four of eight material handling devices such as a plurality of vacuum or suction devices, generally indicated at 28, to pick up a pair of glass sheets from the storage container 14 as illustrated in FIGS. 1 and 2. Under program control, the robot 18 then rotates the end effector 26 180° to allow the upper four suction devices 28 to pick up another pair of glass sheets 10.

Then the robot 18 moves the end effector 26 with respect to the controlled axis to place the four glass sheets 10 into the shipping container 12, two sheets at a time, so that the bottom edges of the glass sheets 10 are supported on a floor 30 of the shipping container 12.

In general, during placement of the pairs of glass sheets 10 in the container 12, the end effector 26 provides horizontal axis panel alignment and also allows the lower four vacuum devices 28 to move in an upward direction in a vertical plane substantially opposite downward movement of a base frame, generally indicated at 32, of the end effector 26 upon engagement of the bottom edges of the glass sheets 10 with the floor 30 of the shipping container 12. Then the glass sheets 10 are released by the suction devices 28 under program control so that the glass sheets 10 are supported in stacks on the floor 30 of the shipping container 12. Then under program control, the robot 18 rotates the end effector 26 180° to allow horizontal axis panel alignment, to allow the other four vacuum devices 28 to be vertically compliant and then release their respective glass sheets. This process is repeated until a desired number of sheets of glass are supported at their bottom edges on the floor 30 of the shipping container 12.

Referring now to FIGS. 2–7, there is illustrated in detail the end effector 26 for use in the method and system of the present invention. In general, the base frame 32 is a weldment adapted to be connected to the robot wrist 22 by means of a plurality of bolts (only one of which is shown at 34 in FIG. 3), dowel pins (not shown), and a plate 35. The base frame 32 has a plurality of aluminum square tubes including horizontally extending tubes 38 and vertically extending tubes 40 which are welded to each other and to a plate 37 to provide the base frame 32.

Figure 3:
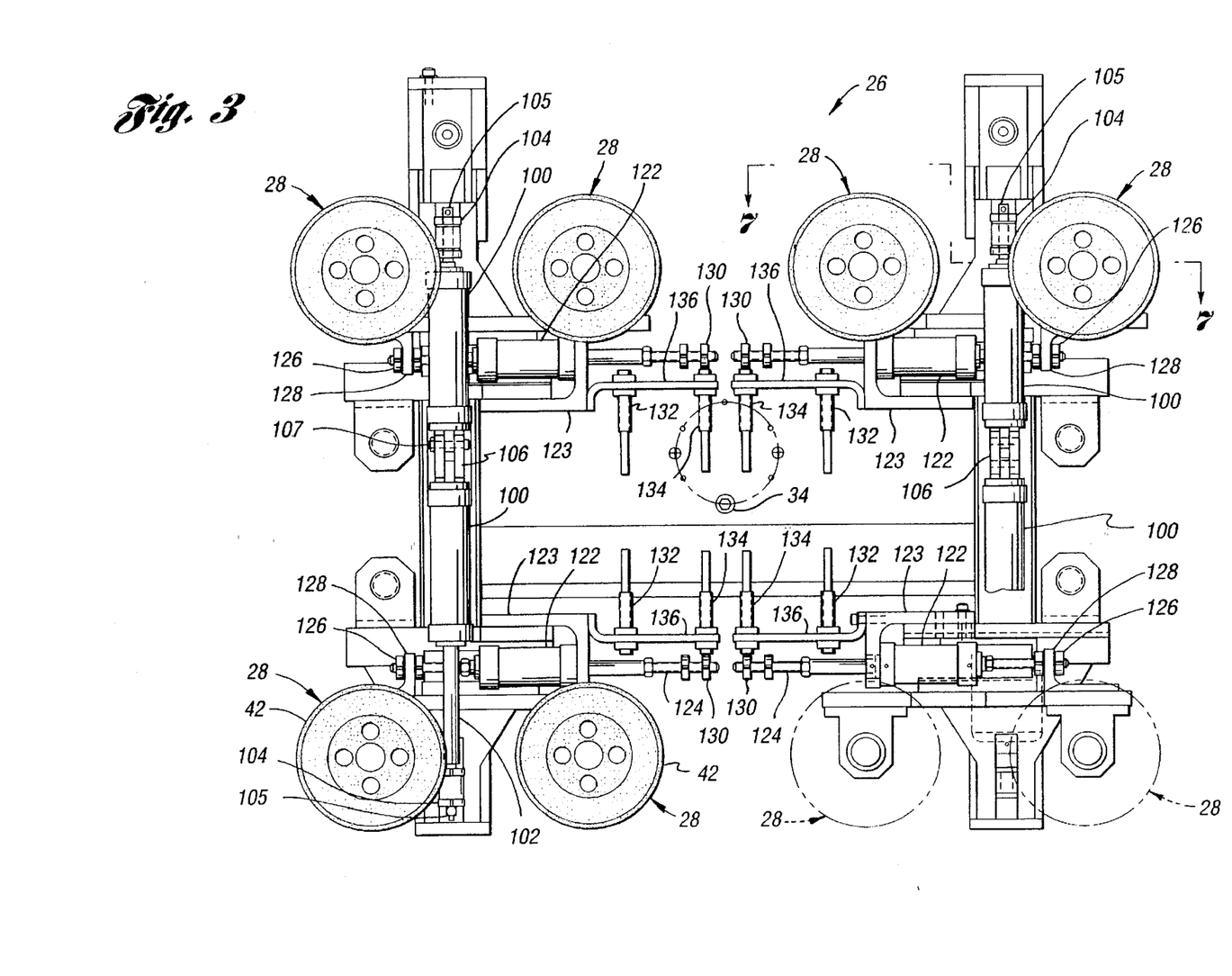
FIG. 3 is a front elevational view of the end effector of FIG. 2 with a pair of suction cups illustrated in phantom.

Preferably, there are eight suction devices 28 provided on the end effector 26 to handle four sheets of glass at a time in transporting the glass sheets 10 from the storage container 14 to the shipping container 12. Obviously, the number of glass sheets that can be transferred is dependent on the number and spacing of the suction devices 28 and the size of the glass sheets. As previously mentioned, by rotating the end effector 26 180°, the upper as well as the lower row of suction devices 28 as shown in FIG. 3 can be utilized to receive and retain pairs of glass sheets 10 from the storage container 14 prior to transporting the entire load of four sheets 10 of glass to the shipping container 12 at which point the lower pair of glass sheets 10 are horizontally aligned and placed on the floor 30 of the shipping container 12. Then the end effector 26 is rotated 180° so that the second pair of glass sheets 10 can be horizontally aligned and placed on the floor 30 of the shipping container 12.

Preferably, each of the suction devices 28 includes a suction cup 42 which is in fluid communication with its respective vacuum generator (not shown) which is mounted on a back surface of the base frame 32. The vacuum generators are responsive to control signals from the controller 24 to create a vacuum at the desired suction cups 42 sufficient to retain the glass sheets 10. Pairs of the suction cups 42 are fluidly connected to corresponding pairs of the vacuum generators which, in turn, are fluidly interconnected by a T-shaped pipe by means of nipples as generally illustrated in the above-noted U.S. Patent to Pearson, U.S. Pat. No. 5,387,068, which is incorporated by reference herein. A silencer (not shown) is connected to each of the vacuum generators to control the noise generated by the vacuum generators.

Figure 7:
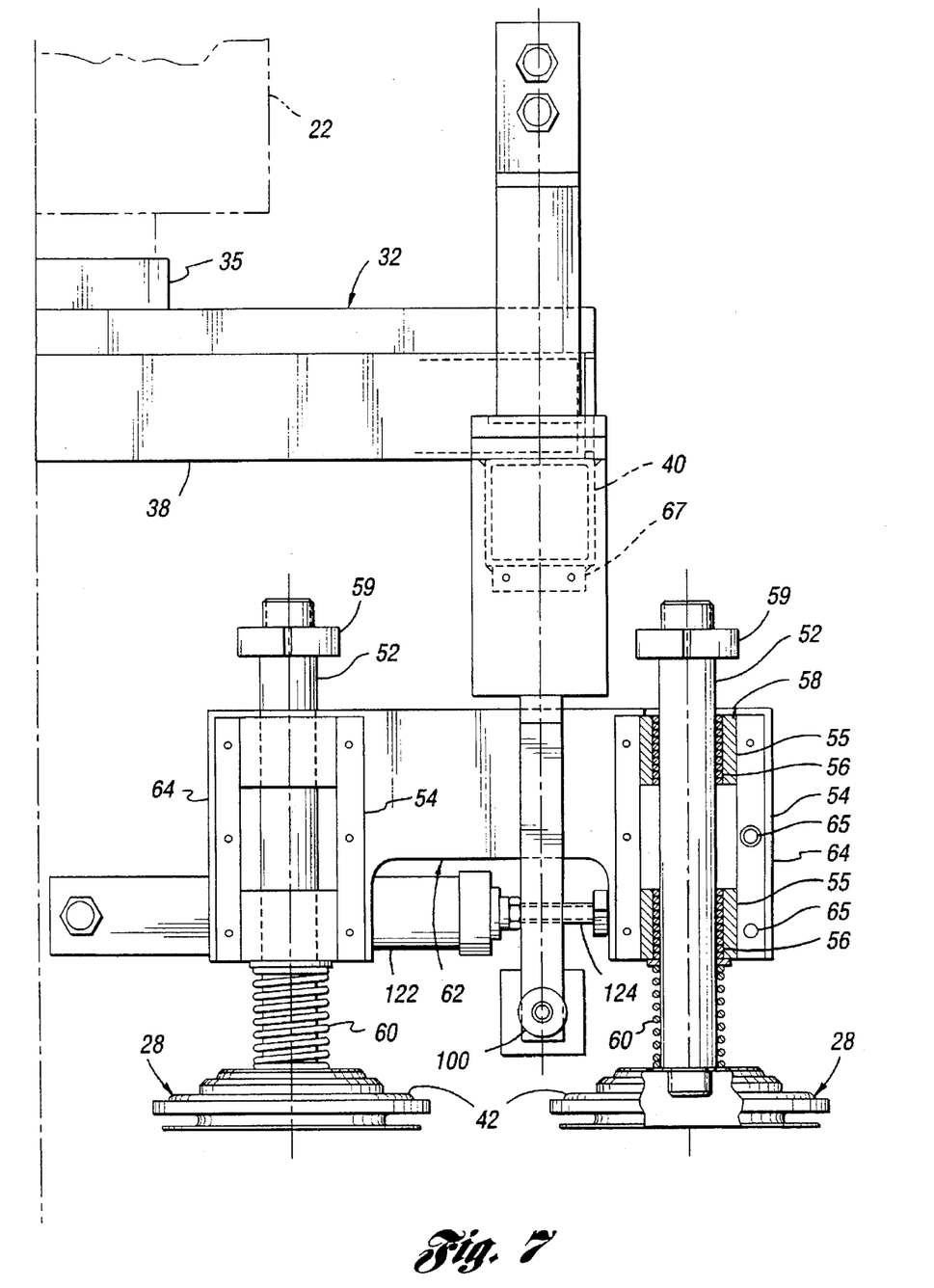
FIG. 7 is a sectional view of the end effector taken along lines 7—7 of FIG. 3.

As best shown in FIG. 7, each suction device 28 further includes a hollow suction cup shaft 52 which is mounted within a bearing housing 54, and bearing blocks 55 by plane bearings 56. Each suction cup shaft 52 supports its suction cup 42 at one end thereof and is fixedly secured to the bearing housing 54 by a thrust washer 58 at its opposite end. Hoses (not shown) fluidly communicate the vacuum generators to the respective suction cups shafts 52 by clamp collars 59 and, consequently, to their respective suction cups 42 to provide the amount of vacuum necessary to hold the glass sheets 10 during movement thereof.

A compression spring 60 extends between each of the bearing housings 54 and its respective suction cup 42 to provide compliance for the suction cups 42 in a direction substantially normal to a vertical plane in which compliance is also provided as described hereinbelow.

Pairs of such vacuum devices 28 are supported on a U-shaped carriage or slide mount, generally indicated at 62. Each slide mount 62 includes panels 64 to which the bearing housings 54 are secured, such as by bolts 65.

Figure 4:
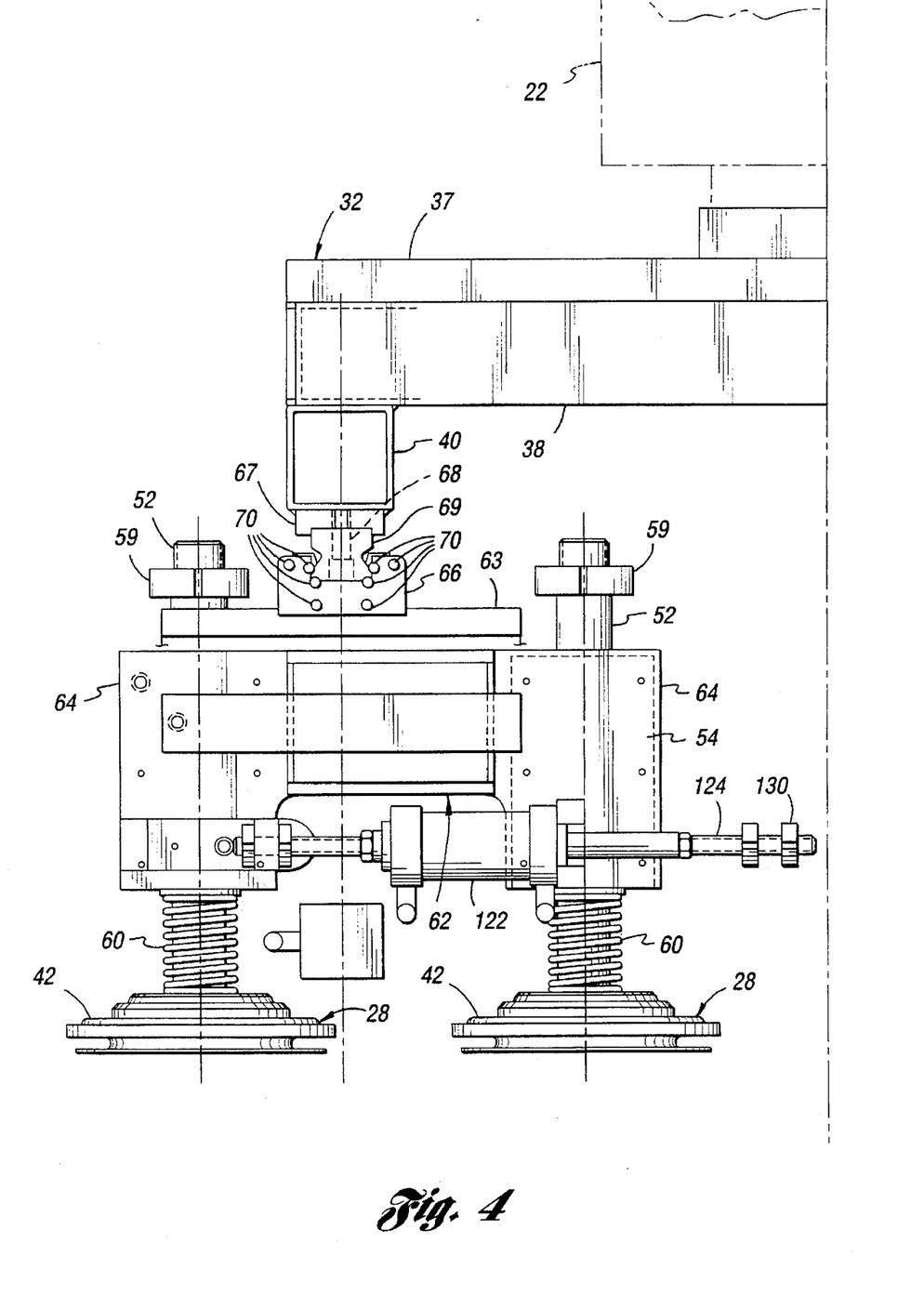
FIG. 4 is a sectional view of the end effector taken along lines 4—4 of FIG. 2 with its carriage retracted.
Figure 5:
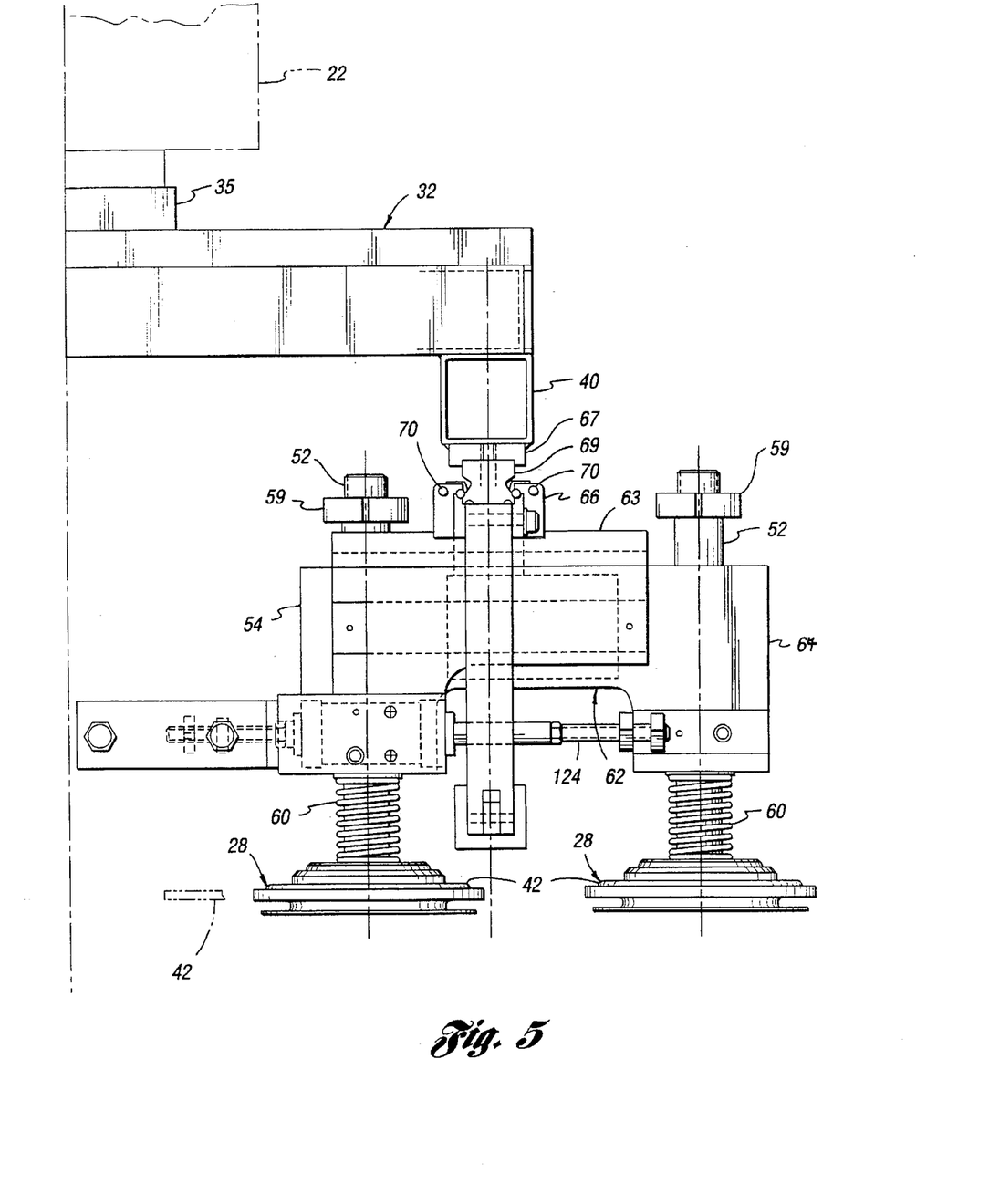
FIG. 5 is a sectional view of the end effector taken along lines 5—5 of FIG. 2 with its carriage extended.
Figure 6:
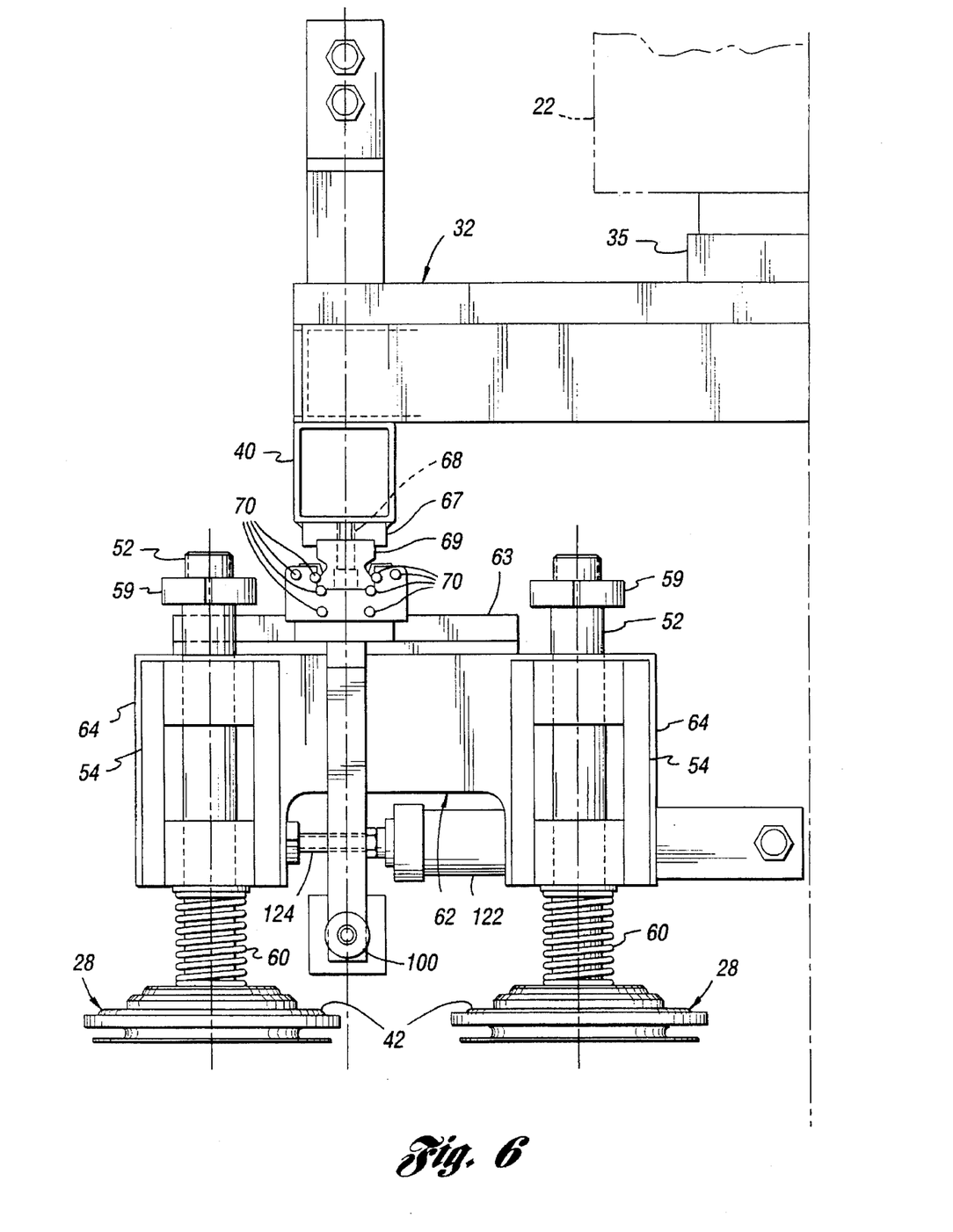
FIG. 6 is a sectional view of the end effector taken along lines 6—6 of FIG. 2.

As shown in FIGS. 4–6, each slide mount 62 also includes a carriage guide or carriage 66 fixedly secured to a plate 63 of the slide mount 62 such as by bolts. Each carriage 66 is slidably mounted on a rail 69 which in turn is fixedly secured to the vertically extending square tubing 40 through a plate 67 and bolts 68 as best shown in FIGS. 4 and 6.

Circulating linear bearings 70 are provided within each of the carriages 66 which together with its respective rail 69 define a linear bearing system or compliance device for associated pairs of the vacuum devices 28.

A locking means or mechanism, generally indicated at 72 in FIG. 2, includes a pneumatic locking cylinder 74 for selectively locking each of the compliance devices in response to a control signal from the controller 24 to prevent relative vertical movement between its respective vacuum device 28 and the base frame 32. Each of the pneumatic locking cylinders 74 is mounted on the base frame 32 by means of a cylinder mounting bracket 76 and a nut 77.

A mounting nut 78 secures a mounting bracket 80 to the cylinder 74. In turn, the bracket 80 supports a pair of inductive proximity switches 82 and 84. A rod 86 of the air locking cylinder 74 has a clamp collar 88 supported thereon for movement therewith. The clamp collar 88 is either disposed adjacent the proximity switch 82 or the proximity switch 84 depending upon whether the rod 86 is in its extended or retracted position. The proximity switches 82 and 84 provide feedback signals to the controller 24 to indicate whether its respective locking mechanism 72 is locked or not.

The opposite end of each rod 86 is connected to a cylinder adaptor 90 at one end thereof by means of a hexagonal nut 92. At the opposite end of the adaptor 90 there is disposed a cone locating pin 94 which, in its extended position, engages a cone locking bushing 96 mounted on each of the plates 63 to lock its carriage 66 in position to prevent undesired movement of the carriage 66 such as during rotation of the end effector 26.

Referring again to FIGS. 2 and 3, a pneumatic counterbalance or counterbalancer, generally indicated at 98, is connected to each of the material handling devices for counterbalancing its respective glass panel based on the size of its panel in response to a pneumatic control signal from the controller 24. In particular, each counterbalancer 98 includes an air cylinder 100 including a rod 102, the free end of which is secured to a cylinder hook-up bracket 103 by a clamp collar 104 and a piston rod stud 105 on the free end of the rod 102. The bracket 103, in turn, is secured to its respective slide mount 62.

Pairs of air cylinders 100 are also pivotally connected by pivot pins 107 to H-shaped cylinder connecting brackets 106 which, in turn, are connected to respective vertical beams 40 by head blocks 109. Activation of the air cylinders 100 provide a variable counterbalance force in the vertical plane for the suction devices 28.

As illustrated in FIG. 2, the end effector 26 also includes a non-contact sensor 108 which is mounted on a sensor bracket 110 which, in turn, is secured to a slide adaptor 111 by bolts 115. The sensor 108 provided thereon provides a signal which can be utilized by the controller 24 to determine location of the sheets of glass 10 within the storage container 14 to aid in the pickup of such sheets of glass 10. Preferably, the non-contact sensor 108 is an ultrasonic sensor. However, the sensor 108 could also be a laser-type sensor.

The sensor 108 is electrically coupled to a sensor circuit board (not shown) which is also fixably secured to the horizontal tubes 38 of the end effector 26. The circuit board receives a signal from the sensor 108 and provides an appropriate output signal to the controller 24 so that the controller 24 can send the appropriate control signals to the robot 18 to control the end effector 26.

In summary, the carriage's pneumatic counterbalance in the vertical plane is under computer control of the controller 24 and can be locked out or released by engaging or disengaging one or more of the pneumatic locking cylinders 74. Each suction cup 42 has a spring-biased compliance that allows for passive compliance-upon-demand normal from the direction of passive compliance-upon-demand of the linear bearing systems in a vertical plane.

Each slide mount 62 also includes a second carriage guide or carriage 112 fixedly secured to a slide mounting plate 114 of the slide mount 62. Each carriage 112 is slidably mounted on a rail 116 which, in turn, is fixedly secured, such as by bolts 118 to the slide adaptor 111. In turn, the slide adaptor 111 is secured to the base frame 32.

Circulating linear bearings 120 are provided within each of the carriages 112 which, together with its respective rail 116, define a second linear bearing system or side-shift alignment device for associated pairs of vacuum devices 28.

Each of the side-shift alignment devices also includes an air cylinder 122 which is mounted by a bracket 123 to the base frame 32 and the cylinder 122. One end of the cylinder 122 is connected by a piston rod stud 126 to a cylinder hook-up bracket 128. The bracket 128, in turn, is connected to the U-shaped slide mount 62. The free end of a piston rod 124 of the cylinder 122 has a clamp collar 130 supported therein for movement therewith. The clamp collar 130 is either disposed adjacent a proximity switch 132 or a proximity switch 134 depending upon whether the rod 124 is in its extended or retracted position. The switches 132 and 134 are mounted on a bracket 136, which, in turn, is mounted to the bracket 123. The proximity switches 132 and 134 provide feedback signals to the controller 24 to indicate whether side-shifting is in either of its extreme positions of travel. Preferably, the side-shifting is approximately 2 inches.

Each air cylinder 122 is adapted to receive pneumatic control signals from the controller 24 to move its material handling device relative to the base frame 32 in a horizontal direction until engagement of a side edge of the glass panel with a side wall or stop (not shown) of the shipping container 12.

Also, in summary, the above-described tooling system allows for multiple glass handling requirements such as: (1) multiple pieces of glass can be handled at one time; the compliance devices will allow for the tooling to be rotated 180° and still be effective; (2) single pieces of glass can be handled by eliminating compliance on the top suction cups 42 during the glass pickup process; (3) 90 degree rotation placement is possible since compliance can be removed during pickup with the end effector rotated 90 degrees out-of-position; then during set-down/release of the glass, the end effector 26 is rotated back 90 degrees to allow the compliance devices to operate; (4) the glass panels are horizontally aligned during the placement of the glass into the shipping crates; the side-shift alignment devices allow the panels to be nested sideways (horizontally) to form a secure park (i.e. "block of ice") for shipping; and (5) tooling and part weight are removed from the glass edge to prevent stressing of the glass edge during the placement and packing process; the pneumatic counterbalancers reduce the loading associated with the additional compliance and side-shifting tooling features and can be programmably controlled to change counterbalance loads based on glass panel size.

While the best mode for carrying out the invention has been described in detail, those familiar with the art to which this invention relates will recognize various alternative designs and embodiments for practicing the invention as defined by the following claims.

What is claimed is:

1. A method for loading a desired number of panels into a shipping container from a storage container at a work station, the work station including a robot controlled by a programmable controller, the robot having an end effector movable with respect to controlled axes, the end effector including a base frame coupled to the robot and at least one material handling device supported on the base frame, the method comprising the steps of:

(a) moving the end effector with respect to the controlled axes to allow the at least one material handling device to pick up at least one panel from the storage container;

(b) moving the end effector with respect to the controlled axes to place the at least one panel in the shipping container;

(c) allowing the at least one material handling device to move relative to the base frame in an upward direction substantially opposite a downward direction of the base frame upon engagement of a bottom edge of the at least one panel with a floor of the shipping container;

(d) moving the at least one material handling device linearly relative to and independent of movement of the base frame in a horizontal direction substantially orthogonal to the upward direction in response to a first control signal from the controller until engagement of a side edge of the at least one panel with a side stop of the shipping container;

(e) releasing the at least one panel after steps (c) and (d) so that the at least one panel is supported on the floor at its bottom edge and the side edge of the at least one panel is positioned in a predetermined relationship with respect to the side stop; and (f) repeating steps (a) through (e) until the desired number of panels are supported at their bottom edges on the floor of the shipping container with substantially no side-to-side variation.

2. The method of claim 1 further comprising the step of counterbalancing the end effector and the at least one panel with a variable amount of counterbalance force based on the size of the at least one panel in response to a second control signal from the controller.

3. A system for loading a desired number of panels into a shipping container from a storage container at a work station, the system comprising:

a program-controlled robot having an arm provided with an end effector movable with respect to controlled axes, wherein the end effector includes a base frame coupled to the arm of the robot and at least one material handling device supported on the base frame to receive and retain at least one panel; and a controller for (1) causing the robot to move the end effector with respect to the controlled axes to pick up the at least one panel from the storage container and place the at least one panel in the shipping container and (2) causing the at least one material handling device to receive, retain and then release the at least one panel so that the at least one panel is supported on a floor of the shipping container at a bottom edge of the at least one panel; and wherein the end effector further includes (a) a vertical compliance device for supporting the at least one material handling device on the base frame to allow the at least one material handling device to move relative to the base frame in an upward direction substantially opposite a downward direction of the base frame upon engagement of the bottom edge of the at least one panel with the floor of the shipping container and (b) a side-shift alignment device for supporting the at least one material handling device on the base frame to linearly move the at least one material handling device relative to and independent of movement of the base frame in a horizontal direction substantially orthogonal to the upward direction in response to a first control signal from the controller until engagement of a side edge of the at least one panel with a side stop of the shipping container and prior to release of the at least one panel by the at least one material handling device.

4. The system as claimed in claim 3 further comprising a counterbalancer connected to the at least one material handling device for counterbalancing the at least one panel based on the size of the at least one panel in response to a second control signal from the controller.

5. The system as claimed in claim 3 wherein the at least one panel is a glass panel.

6. The system as claimed in claim 3 wherein the shipping container is an irregularly-shaped crate.

7. The system as claimed in claim 3 wherein the storage container is a regularly-shaped rack.

8. The system as claimed in claim 3 wherein the end effector includes a plurality of material handling devices supported at a plurality of spaced locations on the base frame to receive and retain a number of panels.

9. The system as claimed in claim 8 wherein each of the material handling devices is a suction device.

10. An end effector for use with a robot controlled by a programmable controller to load a desired number of panels into a shipping container from a storage container at a work station, the end effector comprising:

a base frame adapted to be mounted on the robot;

at least one material handling device supported on the base frame, the at least one material handling device being adapted to receive and retain at least one panel in the storage container and then release the at least one panel in the shipping container so that the at least one panel is supported on a floor of the shipping container at a bottom edge of the at least one panel;

a first vertical compliance device for supporting the at least one material handling device on the base frame to allow the at least one material handling device to move relative to the base frame in an upward direction substantially opposite a downward direction of the base frame upon engagement of the bottom edge of the at least one panel with the floor of the shipping container; and a first side-shift alignment device for supporting the at least one material handling device on the base frame to linearly move the at least one material handling device relative to and independent of movement of the base frame in a horizontal direction substantially orthogonal to the upward direction in response to a first control signal from the controller until engagement of a side edge of the at least one panel with a side stop of the shipping container.

11. The end effector of claim 10 further comprising a programmably controlled counterbalancer for counterbalancing the at least one panel based on the size of the at least one panel in response to a second control signal from the controller.

12. The end effector of claim 10 wherein the at least one material handling device includes a plurality of material handling devices supported at a plurality of spaced locations on the base frame to receive and retain a number of panels.

13. The end effector of claim 12 wherein each of the material handling devices is a suction device.

14. The end effector as claimed in claim 12 further including a second vertical compliance device and wherein the plurality of material handling devices are supported on the base frame by the first and second vertical compliance devices.

15. The end effector as claimed in claim 14 further comprising locking means for selectively locking at least one of the first and second compliance devices in response to an additional control signal from the controller to prevent relative movement between the plurality of material handling devices and the base frame.

16. The end effector as claimed in claim 15 wherein the locking means includes at least one pneumatic cylinder.

17. The end effector as claimed in claim 12 further including a second side-shift alignment device and wherein the plurality of material handling devices are supported on the base frame by the first and second side-shift alignment devices.

18. The end effector as claimed in claim 14 further including a number of programmably controlled counterbalancers connected to the plurality of material handling devices for counterbalancing the number of panels based on the size of the number of panels.

19. The end effector as claimed in claim 10 wherein the first side-shift alignment device includes a linear bearing system.

20. The end effector as claimed in claim 19 wherein the linear bearing system includes a rail and a translating carriage slidably supported on the rail for supporting the at least one material handling device.

* * * * *